United States Patent
Brailovskiy et al.

(10) Patent No.: US 9,892,488 B1
(45) Date of Patent: Feb. 13, 2018

(54) MULTI-CAMERA FRAME STITCHING

(71) Applicant: Amazon Technologies, Inc., Seattle, WA (US)

(72) Inventors: Ilya Vladimirovich Brailovskiy, Mountain View, CA (US); Ilia Vitsnudel, Yehuda (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 245 days.

(21) Appl. No.: 14/838,863

(22) Filed: Aug. 28, 2015

(51) Int. Cl.
*G06T 3/40* (2006.01)
*H04N 5/232* (2006.01)
*H04N 5/225* (2006.01)
*G06T 5/00* (2006.01)

(52) U.S. Cl.
CPC ............ *G06T 3/4038* (2013.01); *G06T 5/002* (2013.01); *H04N 5/2253* (2013.01); *H04N 5/23229* (2013.01); *H04N 5/23238* (2013.01)

(58) Field of Classification Search
CPC ............... H04N 5/2258; H04N 5/2254; H04N 5/23229; H04N 5/23232; H04N 5/2253; H04N 5/23238; G06T 3/4038
See application file for complete search history.

(56) References Cited

U.S. PATENT DOCUMENTS

| | | | | |
|---|---|---|---|---|
| 6,532,036 B1* | 3/2003 | Peleg | .................... | G06T 3/4038 348/36 |
| 7,120,276 B1* | 10/2006 | Brady | .................. | G06K 9/6206 382/107 |
| 2011/0234807 A1* | 9/2011 | Jones | ............... | G08B 13/19641 348/159 |
| 2013/0094705 A1* | 4/2013 | Tyagi | ................. | G06K 9/00369 382/103 |

OTHER PUBLICATIONS

Author Unknown, "Obtaining Depth Information from Stereo Images," Whitepaper—IDS Imaging Development Systems GmbH, Available at: https://de.ids-imaging.com/whitepaper.html?file=tl_files/...Stereo . . . , 9 pages, (2012).
Fleet, "Optical Flow Estimation," Handbook of Mathematical Models in Computer Vision Ch. 5, pp. 237-257, (Jan. 2006).

\* cited by examiner

*Primary Examiner* — Obafemi Sosanya
(74) *Attorney, Agent, or Firm* — K&L Gates LLP

(57) ABSTRACT

Various examples are directed to an image processing system comprising a mounting assembly, a first image sensor, a second image sensor, and a third image sensor. A processor may be programmed to receive, from the first image sensor, a first frame, receive, from the third image sensor, a third frame, and identify a first optical flow from the first frame to the third frame. Based at least in part on the first optical flow, the processor may generate a translation kernel describing a first translation from a first position of the first frame to a destination position, and apply the translation kernel to generate a translated first frame.

20 Claims, 14 Drawing Sheets

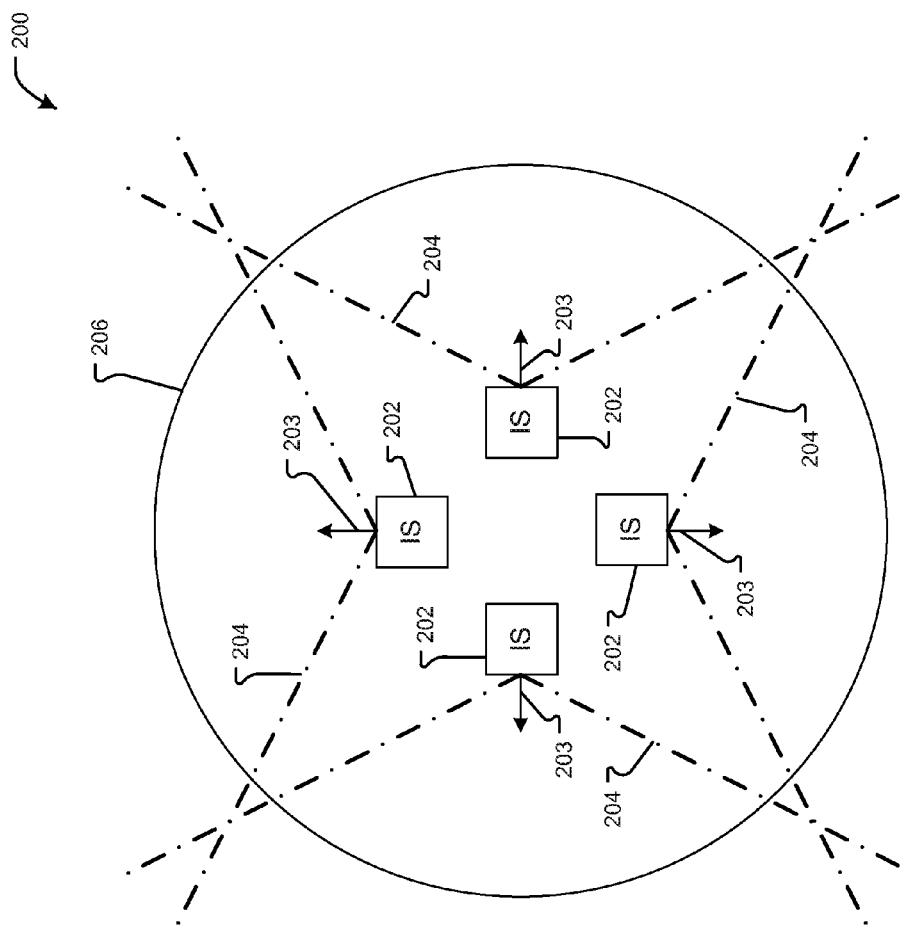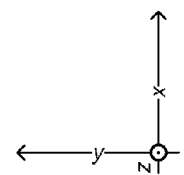
FIG. 5

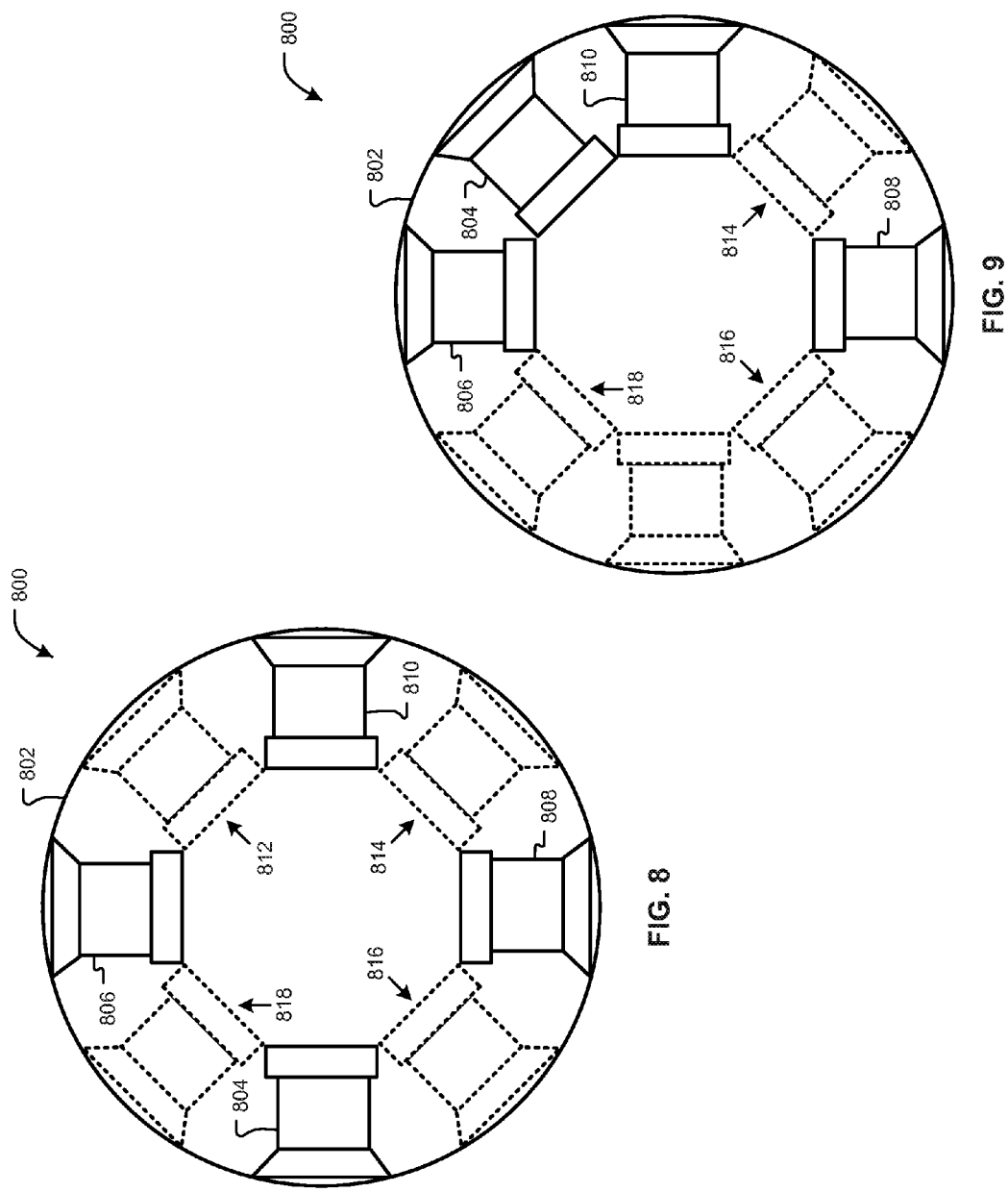

MULTI-CAMERA FRAME STITCHING

BACKGROUND

Some camera systems include multiple image sensors with overlapping fields-of-view. Frames captured by individual image sensors are stitched together to form stitched frames, which are often panoramic. In multi-sensor camera systems, however, different image sensors are often at different locations, meaning that the image sensors do not share a common optical center. As a result, parallax effects can cause different image sensors to view an object at different apparent locations. This can cause ghost artifacts in the stitched frames, where a single object appears at the wrong position or at multiple positions in the frame.

BRIEF DESCRIPTION OF DRAWINGS

FIG. 5 is a diagram showing a cross-sectional view of one example of a panoramic camera system comprising four image sensors.

FIGS. 8 and 9 are diagrams showing examples of a panoramic camera system comprising configurable image sensors.

DETAILED DESCRIPTION

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Figure 1:
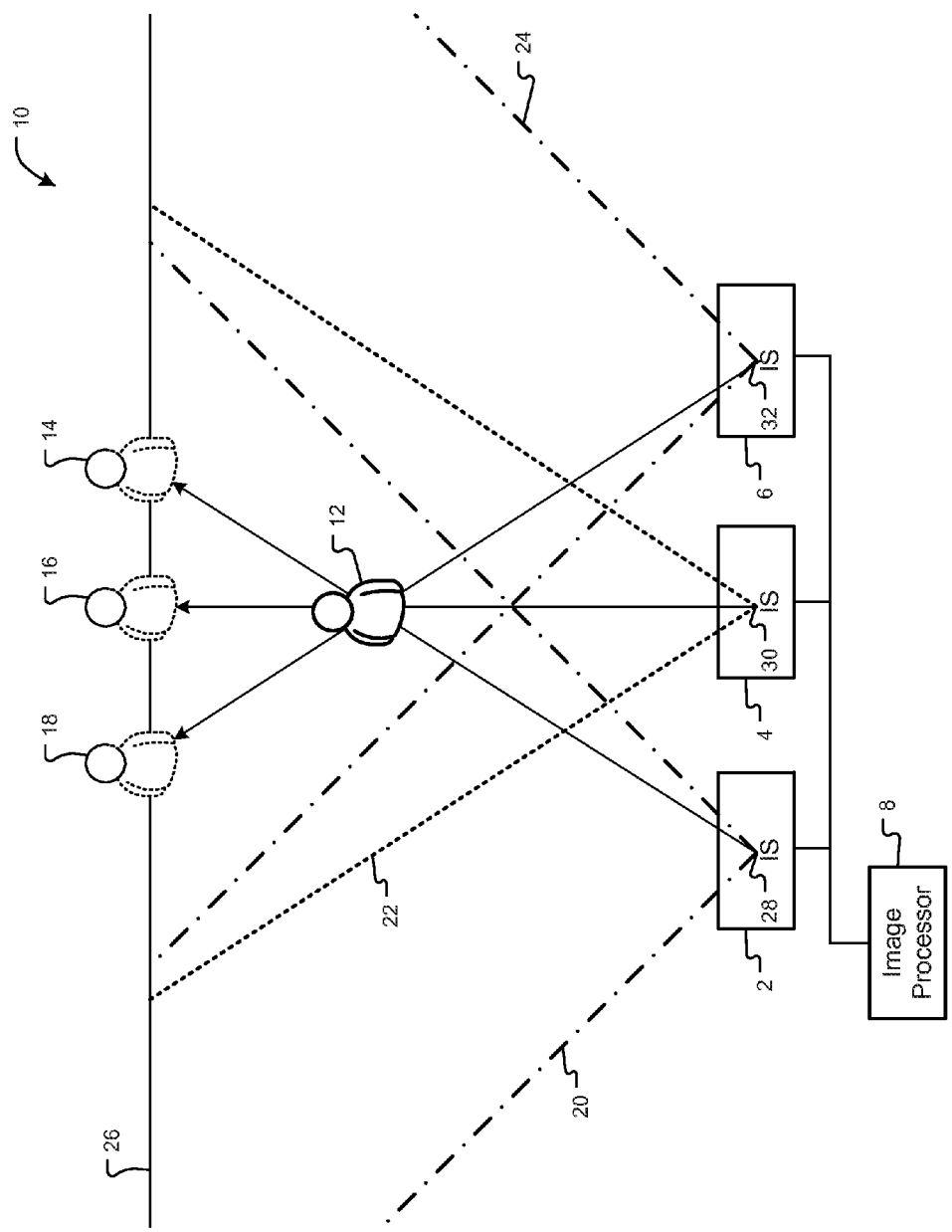
FIG. 1 is a diagram showing one example of an environment for generating a panoramic frame.

Various examples described herein are directed to systems and methods for generating panoramic frames from frames captured by two or more image sensors having different optical centers. Panoramic frames may be stand-alone images and/or may be captured in sequence to form a panoramic video. FIG. 1 is a diagram showing one example of an environment 10 for generating a panoramic frame. The environment 10 comprises image sensors 2, 6. Image sensors 2, 6 are positioned at optical centers 28, 32 that are offset from one another, as shown. The optical center of an image sensor, such as the optical centers 28, 30, 32, may be the point where, due to the optics of the image sensors, all of the light rays that form an image on the sensor intersect (or would intersect if the optics are approximated by a thin lens). Image sensors 2, 6 may comprise any suitable type of image sensor device or devices, such as a charge coupled device (CCD). Image sensors 2, 6 may also include optics, such as lenses or other suitable optical components positioned to focus light reflected towards the image sensor 2, 6 onto the image sensor device. Each image sensor 2, 6 may have a respective field-of-view 20, 24 representing the portion of the environment 10 that is incident on the respective image sensor devices. As illustrated, fields-of-view 20, 24 overlap. Frames captured by the image sensors 2, 6 may be stitched together by an image processor 8 to form a panoramic frame, as described in more detail herein.

Figure 2:
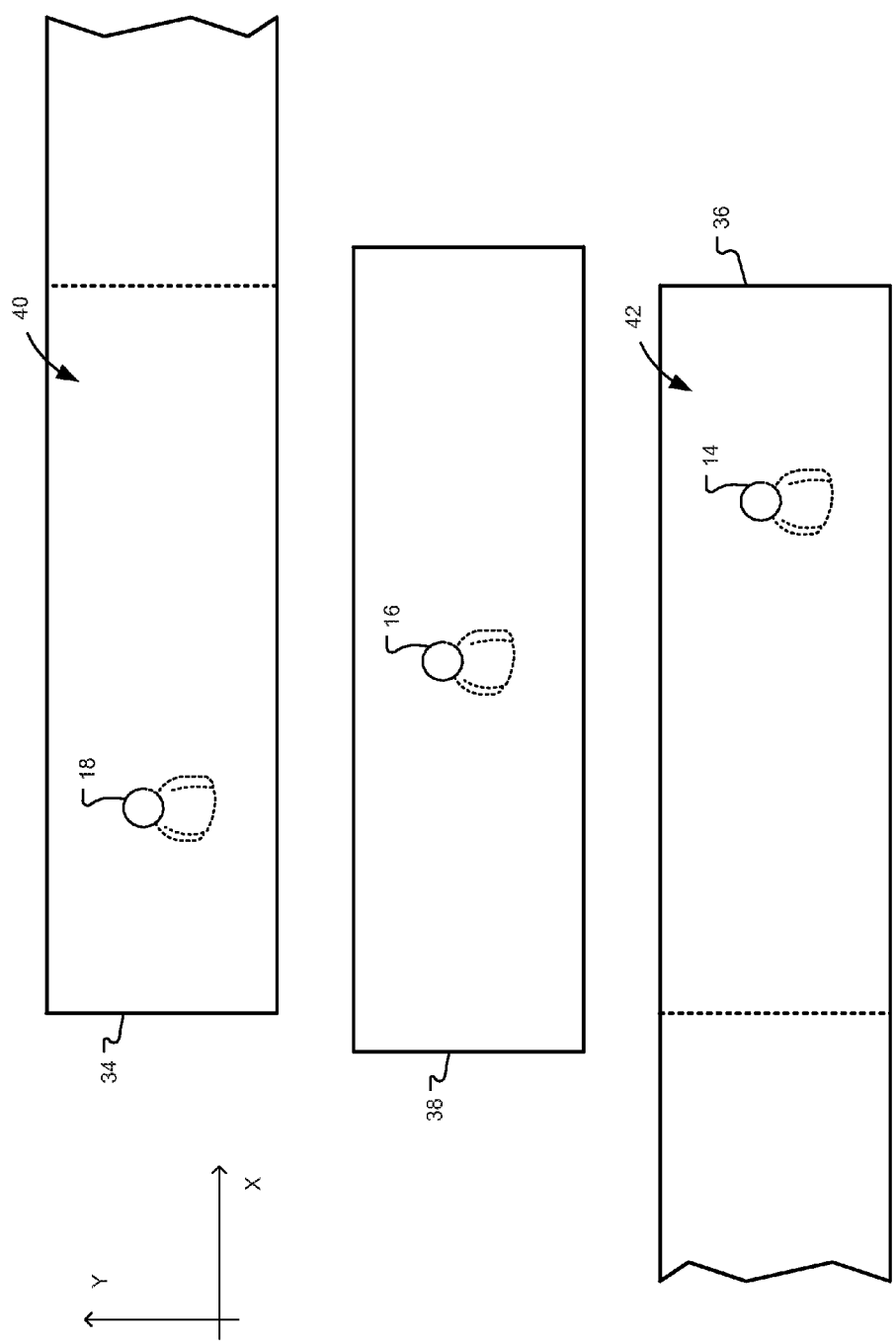
FIG. 2 is a diagram showing example frames captured by the image sensors of the environment of FIG. 1.

FIG. 2 is a diagram showing example frames captured by the image sensors 2, 6. Each frame 34, 36 includes values for a plurality of pixel values organized according to a two-dimensional grid. For example, each pixel value making up the frames 34, 36 may be at a position on the two-dimensional grid described by a position on the X-axis and a position on the Y-axis. Frames 34 and 36 include respective overlap regions 40 and 42. Overlap regions 40, 42 may be the portions of the frames 34, 36 that are in the fields-of-view of both image sensors 2, 6. For example, stitching frames 34, 36 to form a panoramic frame may comprise blending the pixel values in the overlap regions 40, 42.

Referring to FIG. 1, an object 12 is shown at a position that is within the field-of-view 20 of the image sensor 2 and in the field-of-view 24 of the image sensor 6. An image plane 26 illustrates where the object 12 is positioned in frames captured by the various image sensors 2, 6. Positions 14 and 18 are also illustrated in respective frame 34 (captured by image sensor 2) and frame 36 (captured by image sensor 6). Because the image sensors 2, 6 have different optical centers 28, 32, the object 12 appears to be at different positions 14, 18 at the image plane 26 for the different image sensors 2, 6. This can cause parallax or ghosting artifacts when frames captured by the image sensors 2, 6 are stitched to form a panoramic frame. For example, the object 12 may appear in a stitched frame at both positions 18, 14 and/or at the wrong position. In various examples, the image processor 8 may be programmed to correct for parallax or ghosting artifacts utilizing a translation kernel. A translation kernel may describe translations for various pixel values in the overlap regions 40, 42. A translation for a pixel value may be a shift from one position on the two-dimensional grid to another position on the two-dimensional grid. A translation kernel may define translations for all pixel values in an overlap region 40, 42, although some pixels may have a translation of zero. In various examples, a translation kernel may describe different translations for different pixels. For example, a translation kernel may call for one pixel from a frame to be translated down two positions and to the left five positions. The same translation kernel may also call for another pixel from the same frame to be translated down eight positions and to the right two positions. In some examples, each frame 34, 36 may have a distinct translation kernel. In some examples, a single translation kernel may describe translations for multiple frames 34, 36.

Various examples described herein utilize one or more reference image sensors to identify and/or correct for parallax or ghosting artifacts during frame stitching. For example, FIG. 1 shows a reference image sensor 4. The reference image sensor 4 has a field-of-view 22 that overlaps with the fields-of-view 20, 24 of both of the image sensors 2, 6. For example, an optical center 30 of the reference image sensor 4 may be positioned between the optical centers 28, 32 of the image sensors 2, 6. In some examples, the reference image sensor 4 may have a resolution, field-of-view 22, etc. that is the same as the image sensors 2, 6. In other examples, however, the reference image sensor 4 has a lower resolution than the image sensors 2, 6. In some examples, the reference image sensor 4 may have a larger field-of-view than the image sensors 4, 6. For example, the reference image sensor 4 may comprise optics including a parabolic mirror or other component giving the reference image sensor 4 a 360° field-of-view. In some examples, the reference image sensor 4 has a smaller or narrower field-of-view 22 than the image sensors 2, 6. In some examples, the field-of-view 22 of the reference image sensor 4 may cover at least the places where the fields-of-view 20, 24 of the image sensors 2, 6 overlap. For example, a reference frame 38 captured by the reference image sensor 4 may depict the same part of the environment 10 as the overlap regions 40, 42 of the respective frames 34, 36.

As illustrated in FIG. 2, the reference frame 38, captured by the reference image sensor 4, includes a depiction of the object 12 at a reference position 16. Referring to FIG. 1, the reference position 16 may be closer to the actual position of the object 12 projected onto the image plane 26 than the positions 18, 14. Accordingly, the reference frame 38 may provide the reference position 16 and also provide reference positions for other objects appearing in the environment 10. Reference frames, such as 38, may be used in various different ways. In some examples, a reference frame may be utilized to generate a translation kernel for use in stitching frames, such as frames 34, 36, to generate a panoramic frame, as described herein with respect to FIG. 13. Also, in some examples, a reference frame may be utilized to verify the effectiveness of a translation kernel used to stitch a panoramic frame, as described herein with respect to FIG. 13. Various other uses of multiple image sensor systems are described herein.

Figure 3:
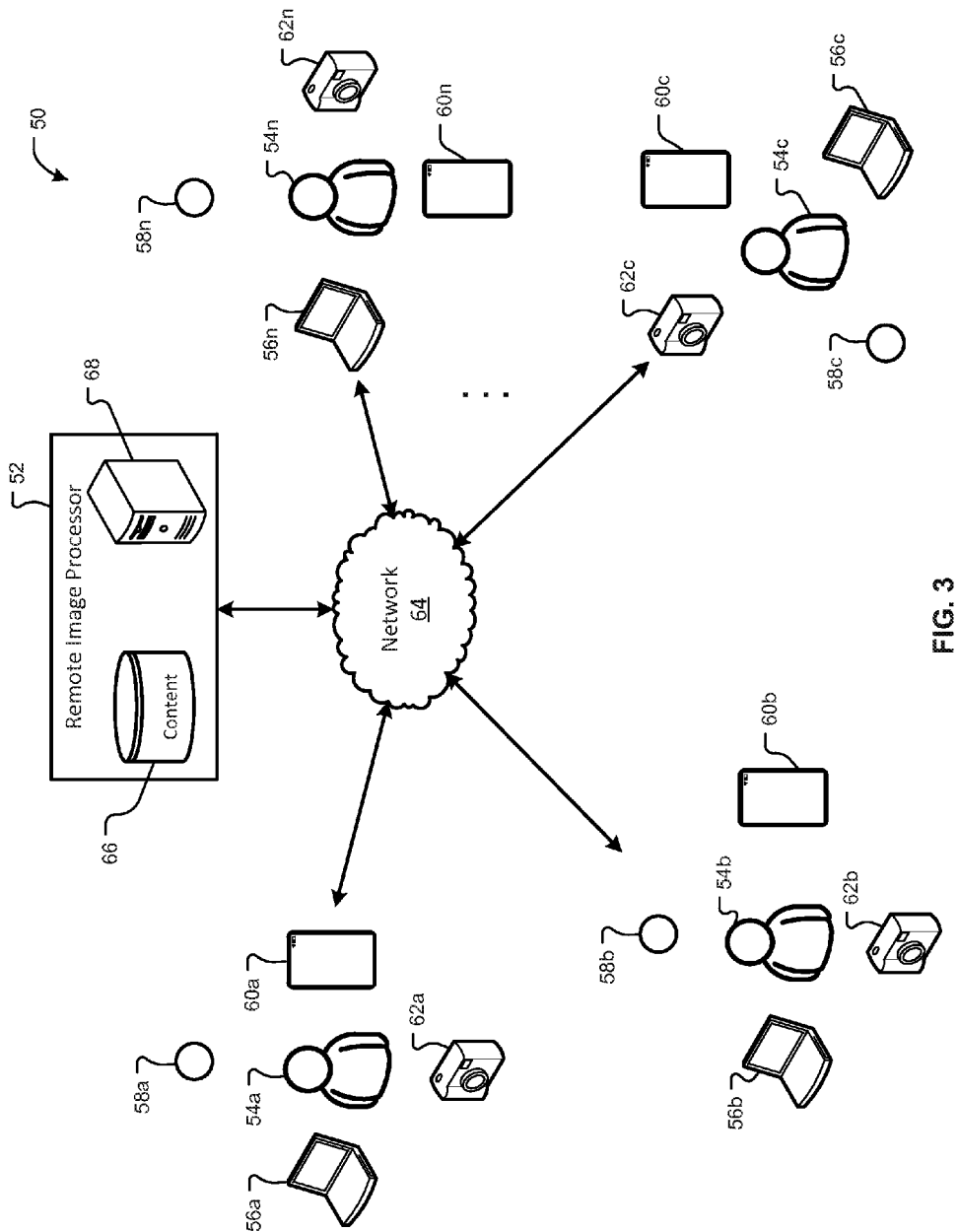
FIG. 3 is a diagram showing one example of an environment for utilizing a reference image sensor, for example to stitch frames captured from multiple image sensors.

FIG. 3 is a diagram showing one example of an environment 50 for utilizing a reference image sensor, for example to stitch frames captured from multiple image sensors. The environment 50 comprises a remote image processor 52 and users 54a, 54b, 54c, 54n. Each user 54a, 54b, 54c, 54n may use one or more user devices such as, for example, panoramic camera systems 58a, 58b, 58c, 58n, digital cameras 62a, 62b, 62c, 62n, mobile devices 60a, 60b, 60c, 60n, or other computing devices 56a, 56b, 56c, 56n. Although four users 54a, 54b, 54c, 54n are shown, any suitable number of users 54a, 54b, 54c, 54n may be part of the environment 50. Also, although each user 54a, 54b, 54c, 54n shown in FIG. 3 is associated with a panoramic camera system 58a, 58b, 58c, 58n, a mobile device 60a, 60b, 60c, 60n, a digital camera 62a, 62b, 62c, 62n and a computing device 56a, 56b, 56c, 56n, some users 54a, 54b, 54c, 54n may use additional user devices and/or fewer user devices than what is shown.

User devices may be utilized to capture frames, transmit images and/or videos to the remote image processor 52, stitch frames into panoramic frames, verify stitching algorithms, etc., as described herein. Panoramic camera systems 58a, 58b, 58c, 58n may include one or more image sensors and associated optics to capture panoramic images and/or panoramic videos. Panoramic camera systems 58a, 58b, 58c, 58n may have a panoramic field-of-view, as described herein. In some examples, a panoramic camera system 58a, 58b, 58c, 58n may comprise a single image sensor with lenses, mirrors or other optics allowing the single image sensor to receive electromagnetic radiation (e.g., light) from the panaromic field-of-view. In some examples, a panoramic camera system 58a, 58b, 58c, 58n may comprise multiple image sensors (e.g., with overlapping fields-of-view). The panoramic camera system 58a, 58b, 58c, 58n (or another component of the environment 50) may be configured to stitch frames from the respective image sensors into a single panoramic frame. In some examples, panoramic camera systems 58a, 58b, 58c, 58n may be configured to communicate with other components of the environment 50 utilizing, for example, a wired or wireless connection. For example, a panoramic camera system 58a, 58b, 58c, 58n may upload a frame or frames to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a panoramic camera system 58a, 58b, 58c, 58n may be configured to upload images and/or video directly to a remote image processor 52, for example, via the network 64. Also, in some examples, a panoramic camera system 58a, 58b, 58c, 58n may comprise a processor and/or other components to implement an image processor (e.g., for multi-camera stitching, as described herein).

Digital cameras 62a, 62b, 62c, 62n may comprise any suitable device with one or more image sensors to capture an image and/or video. In some examples, digital cameras 62a, 62b, 62c, 62n may be configured to communicate with other components of the environment 50 utilizing, for example, a wired or wireless connection. For example, a digital camera 62a, 62b, 62c, 62n may upload images and/or videos to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a digital camera 62a, 62b, 62c, 62n may be configured to upload images and/or video directly to a remote image processor 52, for example, via the network 64. Also, in some examples, a digital camera 62a, 62b, 62c, 62n may comprise a processor and/or other components to implement stitching, as described herein. Digital cameras 62a, 62b, 62c, 62n may have a standard or panoramic field-of-view.

A mobile device 60a, 60b, 60c, 60n may be any suitable type of computing device comprising a processor and data storage. In some examples, a mobile device 60a, 60b, 60c, 60n may be configured to receive frames captured by a panoramic camera system 58a, 58b, 58c, 58n or digital camera 62a, 62b, 62c, 62n and transfer the frames for processing at the remote image processor 52. In some examples, a mobile device 60a, 60b, 60c, 60n may execute an image processor for stitching frames received, for example, from a panoramic camera system 58a, 58b, 58c, 58n or digital camera 62a, 62b, 62c, 62n. Also, in some examples, a mobile device 60a, 60b, 60c, 60n may comprise one or more image sensors and associated optics for capturing images and/or video and either uploading the resulting frames to the remote image processor 52 or performing executing an image processor. In some examples, a mobile device 60*a*, 60*b*, 60*c*, 60*n* may be configured to communicate on a cellular or other telephone network.

A computing device 56*a*, 56*b*, 56*c*, 56*n* may be any suitable type of computing device comprising a processor and data storage including, for example, a laptop computer, a desktop computer, etc. In some examples, a computing device 56*a*, 56*b*, 56*c*, 56*n* may be configured to receive frames captured by a panoramic camera system 58*a*, 58*b*, 58*c*, 58*n* or digital camera 62*a*, 62*b*, 62*c*, 62*n* and transfer the frames for processing at the remote image processor 52. In some examples, a computing device 56*a*, 56*b*, 56*c*, 56*n* may be configured to execute an image processor for processing frames received, for example, from a panoramic camera system 58*a*, 58*b*, 58*c*, 58*n* or digital camera 62*a*, 62*b*, 62*c*, 62*n*. Also, in some examples, a computing device 56*a*, 56*b*, 56*c*, 56*n* may comprise one or more image sensors and associated optics for capturing frames and either uploading the resulting frames to the remote image processor 52 or performing executing an image processor.

The optional remote image processor 52 may perform the various utilities described herein including, for example, generating translation kernels for frame stitching, verifying frame stitching, generating a panoramic depth map, and/or creating High Dynamic Range (HDR) frames from frames received from users 54*a*, 54*b*, 54*c*, 54*n* (e.g., user devices associated with the user), as described herein. The remote image processor 52 may comprise one or more data stores 66 and one or more servers 68. The data store 66 may store frames (e.g., images and/or videos) received from the various user devices, motion kernels, and/or other data associated with frame stitching. The various components 68, 66 of the remote image processor 52 may be at a common geographic location and/or may be distributed across multiple geographic locations. For example, the remote image processor 52 may be implemented in whole or in part as a cloud or Softare as a Service (SaaS) system. In some examples, the remote image processor 52 may perform processing on frames received from multiple different users 54*a*, 54*b*, 54*c*, 54*n* (e.g., via their associated cameras, computing devices, or other devices). The various components of the environment 50 may be in communication with one another via a network 64. The network 64 may be and/or comprise any suitable wired or wireless network configured according to any suitable architecture or protocol. In some examples, the network 64 may comprise the Internet.

Figure 4:
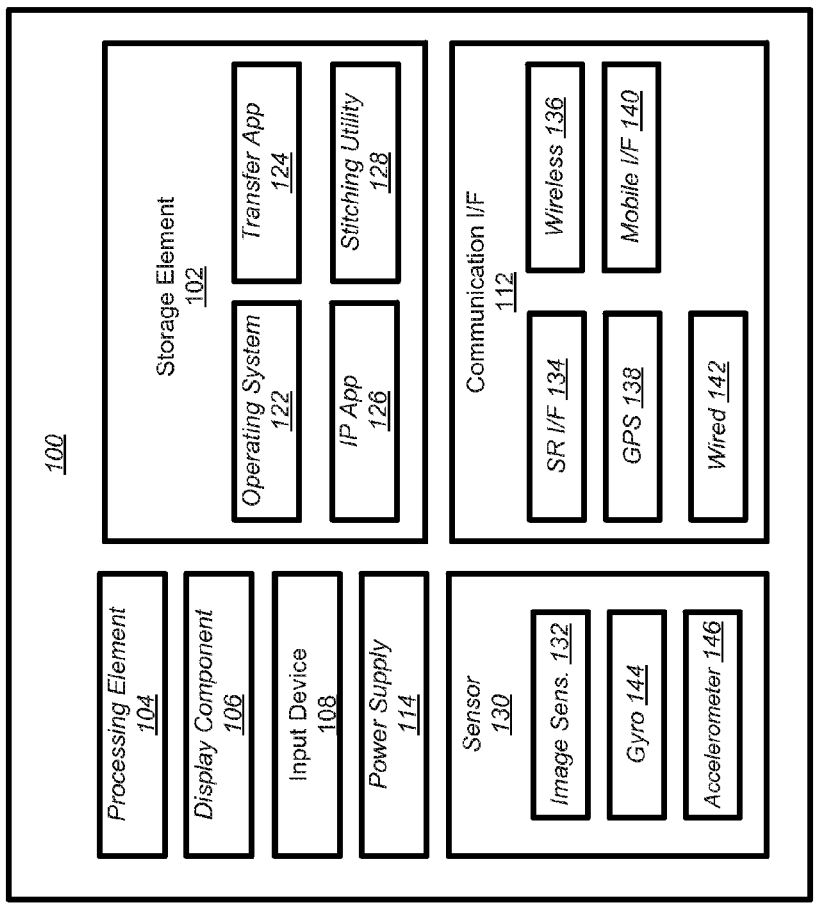
FIG. 4 is a block diagram showing an example architecture of a user device, such as the panoramic cameras, digital cameras, mobile devices and other computing devices described herein.

FIG. 4 is a block diagram showing an example architecture 100 of a user device, such as the panoramic cameras, digital cameras, mobile devices and other computing devices described herein. It will be appreciated that not all user devices will include all of the components of the architecture 100 and some user devices may include additional components not shown in the architecture 100. The architecture 100 may include one or more processing elements 104 for executing instructions and retrieving data stored in a storage element 102. The processing element 104 may comprise at least one processor. Any suitable processor or processors may be used. For example, the processing element 104 may comprise one or more digital signal processors (DSPs). The storage element 102 can include one or more different types of memory, data storage or computer readable storage media devoted to different purposes within the architecture 100. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104. An operating system 122 may provide the user with an interface for operating the user device and may facilitate communications and commands between applications executing on the architecture 100 and various hardware thereof. A transfer application 124 may be configured to receive images and/or video from another device (e.g., a panoramic camera system or digital camera) or from an image sensor 132 included in the architecture 100. In some examples, the transfer application 124 may also be configured to upload the received frames to another device that may perform processing as described herein (e.g., a mobile device, another computing device, or a remote image processor 52). In some examples, a image processor application 126 may perform processing on frames received from an image sensor of the architecture 100 and/or from another device. The image processor application 126 may be included, for example, at a panoramic camera system, a digital camera, a mobile device or another computer system. In some examples, where frame stitching or other processing is performed by a remote image processor or another component of the environment 50, the image processor application 126 may be omitted. A stitching utility 128 may stitch images and/or videos received from multiple image sensors into a single image and/or video. The stitching utility 128 may be included, for example, in a panoramic camera system and/or a mobile device or other computing device receiving input from a panoramic camera system.

When implemented in some user devices, the architecture 100 may also comprise a display component 106. The display component 106 may comprise one or more light emitting diodes (LEDs) or other suitable display lamps. Also, in some examples, the display component 106 may comprise, for example, one or more devices such as cathode ray tubes (CRTs), liquid crystal display (LCD) screens, gas plasma-based flat panel displays, LCD projectors, or other types of display devices, etc.

The architecture 100 may also include one or more input devices 108 operable to receive inputs from a user. The input devices 108 can include, for example, a push button, touch pad, touch screen, wheel, joystick, keyboard, mouse, trackball, keypad, light gun, game controller, or any other such device or element whereby a user can provide inputs to the architecture 100. These input devices 108 may be incorporated into the architecture 100 or operably coupled to the architecture 100 via wired or wireless interface. When the display component 106 includes a touch sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging.

The architecture 100 may also include a communication interface 112, comprising one or more wired or wireless components operable to communicate with one or more other user devices and/or with the remote image processor 52. For example, the communication interface 112 may comprise a wireless communication module 136 configured to communicate on a network, such as the network 64, according to any suitable wireless protocol, such as IEEE 802.11 or another suitable wireless local area network WLAN protocol. A short range interface 134 may be configured to communicate using one or more short range wireless protocols such as, for example, near field communications (NFC), Bluetooth™, Bluetooth LE™, etc. A mobile interface 140 may be configured to communicate utilizing a cellular or other mobile protocol. A Global Positioning System (GPS) interface 138 may be in communication with one or more earth-orbiting satellites or other suitable position-determining systems to identify a position of the architecture 100. A wired communication module 142 may be configured to communicate according to the Universal Serial Bus (USB) protocol or any other suitable protocol.

The architecture 100 may also include one or more sensors 130 such as, for example, one or more image sensors and one or more motion sensors. An image sensor 132 is shown in FIG. 4. Some examples of the architecture 100 may include multiple image sensors 132. For example, a panoramic camera system may comprise multiple image sensors 132 resulting in multiple images and/or video frames that may be stitched to form a panoramic output. Motion sensors may include any sensors that sense motion of the architecture including, for example, gyro sensors 144 and accelerometers 146. Motion sensors, in some examples, may be included in user devices such as panoramic cameras, digital cameras, mobile devices, etc., that capture video or images for frame stitching. The gyro sensor 144 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 146 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 138 may be utilized as a motion sensor. For example, changes in the position of the architecture 100, as determined by the GPS interface 138, may indicate the motion of the GPS interface 138.

The image sensors 2, 4, 6 shown in FIG. 1 are arranged in a linear manner. It will be appreciated, however, that various panoramic camera systems may include image sensors arranged in other configurations as well. For example, FIG. 5 is a diagram showing a cross-sectional view of one example of a panoramic camera system 200 comprising four image sensors 202. The image sensors 202 may be mounted in a mounting assembly 206 in any suitable manner. Adjacent image sensors 202 may be rotated by 90°. For example, a center of the respective fields-of-view 204 of the sensors 202 may be orthogonal to one another. The image sensors 202 may be or include any suitable type of sensor including, for example, charge coupled devices. Image sensors 202 may also include lenses, mirrors or other suitable optics. Each image sensor 202 may have a field-of-view indicated by 204. The fields-of-view 204 may overlap, as indicated. In some examples, the fields-of-view 204 may be equal (e.g., the fields-of-view 204 may subtend the same angle. For example, each of the fields-of-view 204 subtend 120°. Frames captured by the various image sensors 202 may be stitched into a panoramic frame. For example, collectively, the image sensors 202 may have a 360° field-of-view. Each image sensor may be directed in an image sensor direction 203. For example, respective image sensor directions 203 may be positioned in the middle of the respective fields-of-view 204 of the image sensors 202. In some examples, the panoramic camera system 200 may comprise more or fewer image sensors either directed on the xy plane like the image sensors 202 or in another position. For example, the panoramic camera system 200 may comprise one or more image sensors directed in the positive and/or negative z direction. The field-of-view of such an example of the panoramic camera system 200 may be as much as 4π steradians.

Figure 6:
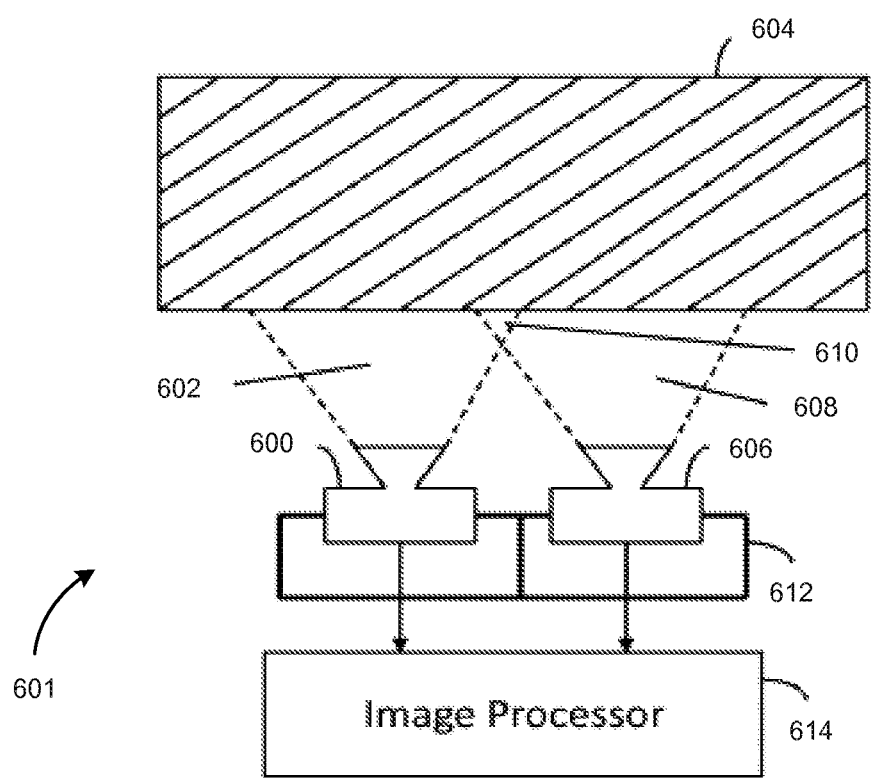
FIG. 6 is a diagram demonstrating one example of a calibration set up that may be used to stitch image sensor frames from a panoramic camera system.

Any of the image processors described herein may be programmed to stitch frames from two or more image sensors with overlapping fields-of-view to generate a panoramic frame. For example, FIG. 6 is a diagram demonstrating one example of a calibration set up that may be used to stitch image sensor frames from a panoramic camera system. A panoramic camera system 601 comprises example image sensors 600, 606, a mounting assembly 612 and an image processor 614. For example, the image processor 614 may include the processing element 104 executing the stitching utility 128, described herein. Image sensor 600 has a field-of-view 602, while image sensor 606 has a field-of-view 608.

The fields-of-view 602, 608 have an overlap 610. The image sensors 600, 606 may have fixed positions on the mounting assembly 612. The image sensors 600, 606 may have fixed positions other than those shown in FIG. 6. For example, the image sensors may have the fixed positions illustrated in any of the figures herein or any other suitable position. Although two image sensors 600, 606 are shown in FIG. 6, any suitable number of image sensors may be used including, for example, four image sensors as illustrate din FIG. 5. The image sensors 600, 606 may capture image data and provide the image data to the image processor 614. The image processor 614 may be or comprise any suitable type of computing device comprising a central processor, a graphics processing unit and/or another type of processor.

The image processor 614 may be programmed to utilize frames captured by the image sensors 600, 606 to determine distortion parameters and/or alignment parameters, such as the overlap 610. For example, the image sensors 600, 606 may capture calibration frames showing a standardized calibration fixture 604 from the first and second image sensors 600, 606. The calibration fixture 604 may be any object having thereon a test pattern that allows the image processor 614 to determine the level of overlap 610 at the pixel level. For example, the calibration fixture 604 may comprise a block, a plate, a cylinder, etc. made from plastic, wood, metal or any other suitable material. The test pattern may be affixed to the calibration fixture 604 in any suitable manner. For example, the test pattern may be painted, printed, etc. In some examples, the test pattern may be printed on a decal that is bonded to the calibration fixture. In addition, the calibration fixture 604 may enable the image processor 614 to accommodate any vertical, horizontal, or rotational misalignment of the image sensors 600, 606 as well as any focus errors or areas of soft focus for each image sensor 600, 606 so that the image correction processing can be applied.

In various examples, the test pattern of the calibration fixture 604 includes straight lines. For example, the test pattern may comprise a set of diagonal lines, as illustrated in FIG. 6, or may be in the form of a grid. The image processor 614 may review frames showing the test pattern captured by various image sensors 600, 606. In various examples, the field-of-view 602, 608 of one or both of the image sensors 600, 606 may have areas of distortion, for example, due to a lens in the optical system (e.g., a lens associated with the image sensor 600, 606 and/or the curved outer surface of an enclosure described herein), or due to some other irregularity in the system. To produce an output image and/or video stream from both image sensors 600, 606, it may be desirable to minimize or eliminate non-uniform distortion, for example, along the edges where frames are joined. For example, frames of the calibration fixture 604 captured by the image sensors 600, 606 may be analyzed by the image processor 614 to generate an indication of distortions for points in an image plane corresponding to each of the image sensors 600, 606. The image processor may derive distortion parameters for the various image sensors 600, 606, for example, by observing the curvature of the straight lines of the test pattern as depicted in the frames. For example, distortion parameters may correct for curvature in the straight lines of the test pattern as depicted in frames from the image sensors 600, 606. The image processor 614 may apply corrections to the distortions in order to generate stitched images and/or video with minimal distortions between image sensor feeds.

The test pattern of the calibration fixture 604 may, in some examples, comprise a color chart and/or uniform gray chart. For example, these charts may allow the image processor 614 to analyze potential differences in color accuracy, relative illumination, and relative uniformity between image sensors 600, 606. Differences may be stored as correction factors and may be utilized by the image processor 614 in the stitching process to reduce noticeable differences between image streams. The calibration process may allow for a stitched frame to be stitched from multiple frames received from the image sensors with the viewer being unable to perceive any meaningful change in image quality through the entire stitched frame. The stitched frame may be a stand-alone image or may be part of a panoramic video.

Figure 7:
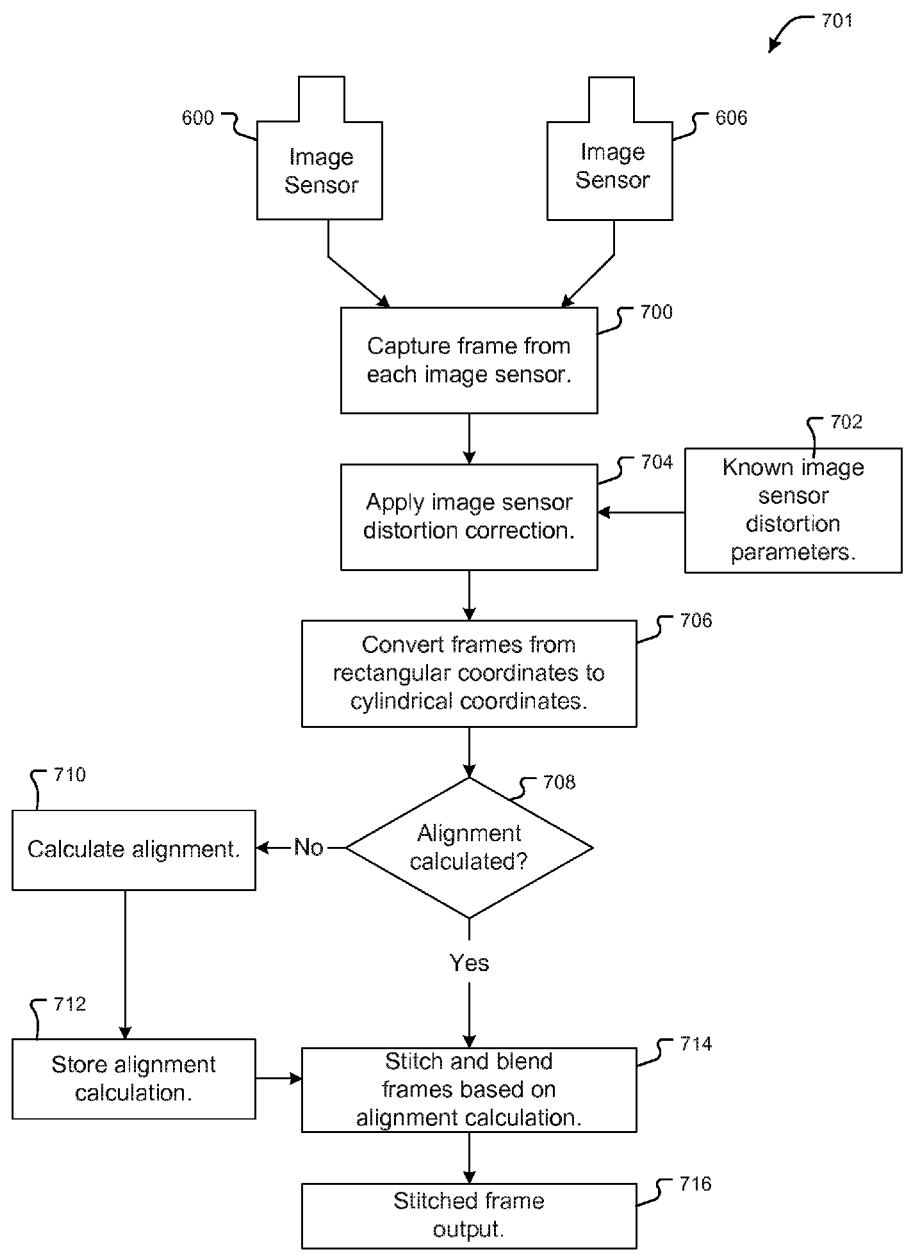
FIG. 7 is a workflow showing one example of a process for stitching frames from image sensors of a panoramic camera system.

FIG. 7 is a workflow 701 showing one example of a process for stitching frames from image sensors of a panoramic camera system. The workflow 701 is described in the context of the panoramic camera system 601 of FIG. 6, although it may be used with any of the panoramic camera systems described herein. At 700, the image processor 614 may capture frames from the image sensor 600 and the image sensor 606 (e.g., simultaneously). The frames may be still images and/or part of a video. Stored camera or image sensor distortion parameters 702 may be applied by the image processor at 704. For example, the image sensor distortion parameters may be based on frames showing the calibration fixture 604, as described herein. Optionally, at 706, the image processor 614 may convert the frames to cylindrical coordinates. For example, frames captured by the image sensors 600, 606 may be initially configured according to the lens or lenses used with the image sensors 600, 606. For example, if a fisheye lens is used, incoming frames may be arranged according to a fisheye coordinate system where each point in the frame had a viewing angle proportional to its distance from the center of the frame. Converting the frames to cylindrical coordinates may facilitate the stitching process by allowing the image processor to align the extremities of the frames.

At 708, the image processor may determine whether an alignment has been calculated. If not, an alignment between the image sensors 600, 606 may be found at 710 and stored at 712. Generating the alignment may comprise identifying the overlap regions of the respective frames and determining a translation kernel to correct for parallax or ghosting artifacts. In some examples, overlap regions may be determined considering the position of the optical centers of the image sensors 600, 606 and their respective fields-of-view 602, 608. Translation kernels may be found in any suitable manner. For example, translation kernels may be found considering a reference frame from a reference image sensor, as described herein. The image processor 614 may proceed to 714. If an alignment between the image sensors 600, 606 has already been found at 708, the image processor 614 may also proceed to 714 where it may stitch the frames, blending the images based on the stored alignment calculation. For example, stitching may include translating pixels from the frames as indicated by the translation kernel. Stitching at 714 may be performed in any suitable manner. In some examples, the image processor 614 may apply an alpha blending method. According to an alpha blending method, the image processor 614 may average redundant pixels from adjacent frames. Different stitching algorithms may provide best results with different levels of overlap between adjacent frames, as described herein. The result of the stitching at 714 may be a stitched frame, output at 716. The stitched frame may be a stand-alone image or part of a video. Although the workflow 701 is described with respect to two image sensors 600, 606, it may be used to stitch any suitable number of frames from any suitable number of image sensors.

Camera distortion and alignment parameters used in the workflow 701 may be found utilizing a calibration process, for example, as described above with respect to FIG. 6. Example image sensor distortion parameters include a lens distortion parameter and a image sensor field-of-view (FOV) parameter, which may be found for each image sensor of a panoramic camera system. Example alignment parameters include linear and/or angular offsets between each image sensor that may be used to determine the overlap between the images generated by the image sensors (e.g., 610 in FIG. 6), and translation kernels, as described herein.

FIGS. 8-12 illustrate physical configurations for various panoramic camera systems that may be utilized to capture frames for the various stitching and other algorithms described herein. For example, FIGS. 8 and 9 are diagrams showing examples of a panoramic camera system 800 comprising configurable image sensors 804, 806, 808, 810. Image sensors 804, 806, 808, 810 are positioned on a mounting assembly 802. The image sensors 804, 806, 808, 810 may have overlapping fields-of-view, for example, similar to the image sensors shown herein including at FIGS. 1, 5 and 6. The mounting assembly 802 may be made from any suitable type of metal, plastic or other material. In some examples, the mounting assembly comprises mounting positions where image sensors can be secured to the mounting assembly 802. Mounting positions may also maintain the optical centers of the image sensors 804, 806, 808, 810 at a constant position. Mounting positions may comprise one or more securing mechanisms to secure the image sensors 804, 806, 808, 810 to the mounting assembly 802. Securing mechanisms may be of any suitable type. In some examples, the mounting assembly 802 may comprise a plate. The mounting positions may include, for example, indentations in the plate contoured to receive the image sensors 804, 806, 808, 810. Also, in some examples, the image sensors 804, 806, 808, 810 may comprise wires or cables extending therefrom, for example, to carry power to the image sensors 804, 806, 808, 810 and/or signals from the image sensors 804, 806, 808, 810. The mounting assembly 802 may comprise clips or other devices to secure the cables. Securing the cables may aid in securing the image sensors 804, 806, 808, 810 themselves. In some examples, a glue may be used to secure the image sensors 804, 806, 808, 810 to the mounting assembly 802.

In the configuration shown in FIG. 8, the image sensors 804, 806, 808, 810 are mounted in positions 90° apart from one another, for example, similar to the configuration of the panoramic camera system 200 shown in FIG. 5. One or more additional mounting positions 812, 814, 816, 818 are shown r from the position of the image sensors 804, 806, 808, 810 by about 45°. In the configuration of FIG. 9, the image sensor 804 is removed from its position in FIG. 8 and positioned at the mounting position 812. In this way, the image sensor 804 may serve as a reference image sensor for the image sensors 806, 810, for example, in the manner described above with respect to FIG. 1 to determine a translation kernel for stitching images. In some examples, the various image sensors 804, 806, 808, 810 may be moved to different positions on the mounting assembly 802 to create reference image sensors for other combinations. For example, the image sensor 806 or 804 may be moved to mounting position 814 to serve as a reference image sensor for the image sensors 808 and 810. The image sensor 806 or 810 may be moved to mounting position 816 to serve as a reference image sensor for image sensors 804 and 808. Image sensor 810 or 808 may be moved to mounting position 818 to serve as a reference sensor for image sensors 804 and 806. Image sensor 808 may be moved to the mounting position 812 to serve as a reference image sensor for image sensors 806 and 810, etc.

Figure 10:
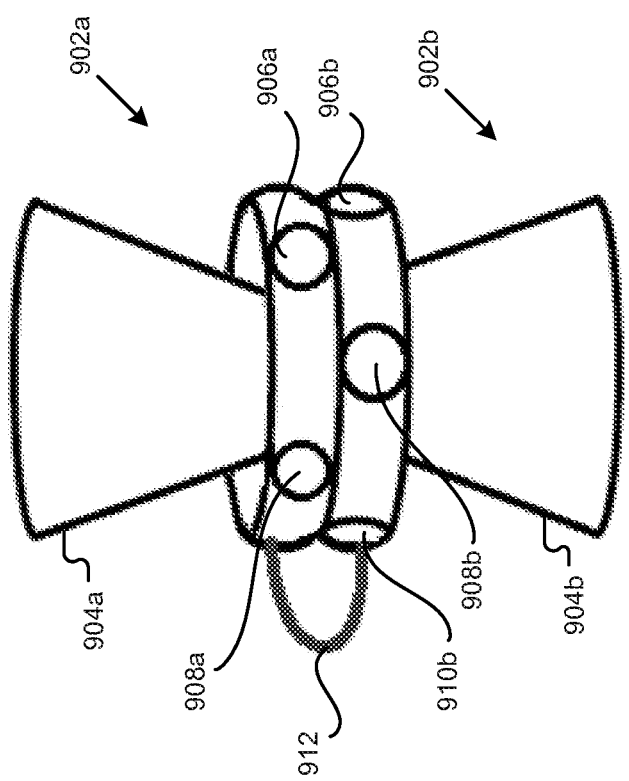
FIG. 10 is a diagram showing one example of a pair of panoramic cameras systems configured for performing image stitching as described herein.

FIG. 10 is a diagram showing one example of a pair of panoramic cameras systems 902a, 902b configured for performing image stitching as described herein. The panoramic camera systems 902a, 902b, in some examples, may have architectures similar to the architecture 100 described herein. The panoramic camera systems 902a, 902b may have image sensors 906a, 906b, 908a, 908b, 910b mounted in respective mounting assemblies 904a, 904b. Although image sensors 906a, 906b, 908a, 908b, 910b are shown in FIG. 10, each panoramic camera system may comprise four image sensors arranged in a manner similar to that described herein with respect to FIG. 5. For example, each image sensor in a particular panoramic camera system 902a, 902b may be rotated relative to adjacent image sensors by about 90°. In some examples, the panoramic camera systems 902a, 902b may comprise more or fewer than four image sensors and the angular offset between adjacent sensors may be decreased or increased accordingly. Angular offset may be an angle between the centers of the fields-of-view of the respective sensors. In the example configuration shown in FIG. 10, the panoramic camera systems 902a, 902b are positioned with image sensors from one system offset between image sensors of the other system. For example, as illustrated, the image sensor 906a is positioned between image sensors 906b and 908b and may act as a reference image sensor for 906b and 908b. Similarly, the image sensor 908b is positioned between image sensors 908a and 906a and may act as a reference image sensor for 908a and 906a. Also, similarly, the image sensor 908a is positioned between image sensors 910b and 908b and may act as a reference image sensor for 910b and 908b. In some examples, adjoining surfaces of the respective panoramic camera systems 902a, 902b may comprise keyed features such as grooves, etc. that are positioned to maintain the described orientation between the image sensors.

The panoramic camera systems 902a, 902b may be in communication with one another via any suitable wired or wireless connection, for example, utilizing respective communications interfaces similar to the communications interface 112 described above. FIG. 10 shows a wired connection 912 between the panoramic camera systems 902a, 902b, although a wireless connection, such as a Bluetooth™ connection, may alternately be used. In some examples, communication between the panoramic camera systems 902a, 902b may enable the panoramic camera systems 902a, 902b to take synchronized images. For example, when images from the two camera systems 902a, 902b are take at or about at the same time, it may enable and/or simplify the process of utilizing image sensors from one panoramic camera system 902a, 902b as reference image sensors for the other panoramic camera system 902a, 902b. In some examples, one panoramic camera system 902a may generate a synchronization signal and send it to the other panoramic camera system 902b via the wired connection 912 or a wireless connection. The synchronization signal, for example, may be a square wave and may reproduce or otherwise indicate a clock signal of the sending panoramic camera system 902a. The receiving panoramic camera system 902b may modify its own clock signal to match the synchronization signal. To take a synchronized frame, one of the panoramic camera systems 902a, 902b may instruct the other system 902a, 902b to capture one or more frames on a particular clock cycle.

Figure 11:
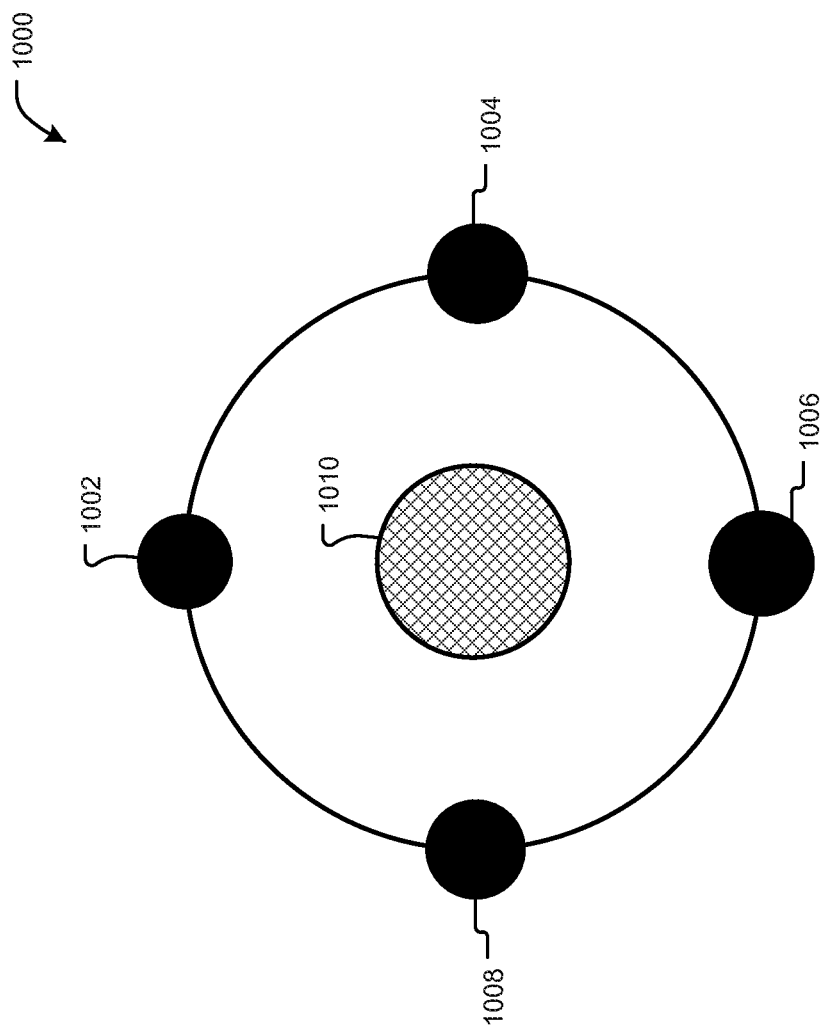
FIG. 11 is a diagram showing one example of a layout for a panoramic camera system.

FIG. 11 is a diagram showing one example of a layout for a panoramic camera system 1000. The panoramic camera system 1000 comprises four image sensors 1002, 1004, 1006, 1008. The image sensors 1002, 1004, 1006, 1008 may have overlapping fields-of-view, for example, similar to the configuration of the panoramic camera system 200 shown in FIG. 5. A reference image sensor 1010 may have a 360° field-of-view. For example, the image sensor 1010 may comprise a panoramic mirror or other suitable optics giving the image sensor 1010 a 360° or similar field-of-view. Accordingly, the image sensor 1010 may serve as a reference image sensor for the other image sensors 1002, 1004, 1006, 1008 of the panoramic camera system 1000. Although four image sensors 1002, 1004, 1006, 1008 are shown in FIG. 11 in addition to the reference image sensor 1010, in various examples, any suitable number of image sensors may be used.

Figure 12:
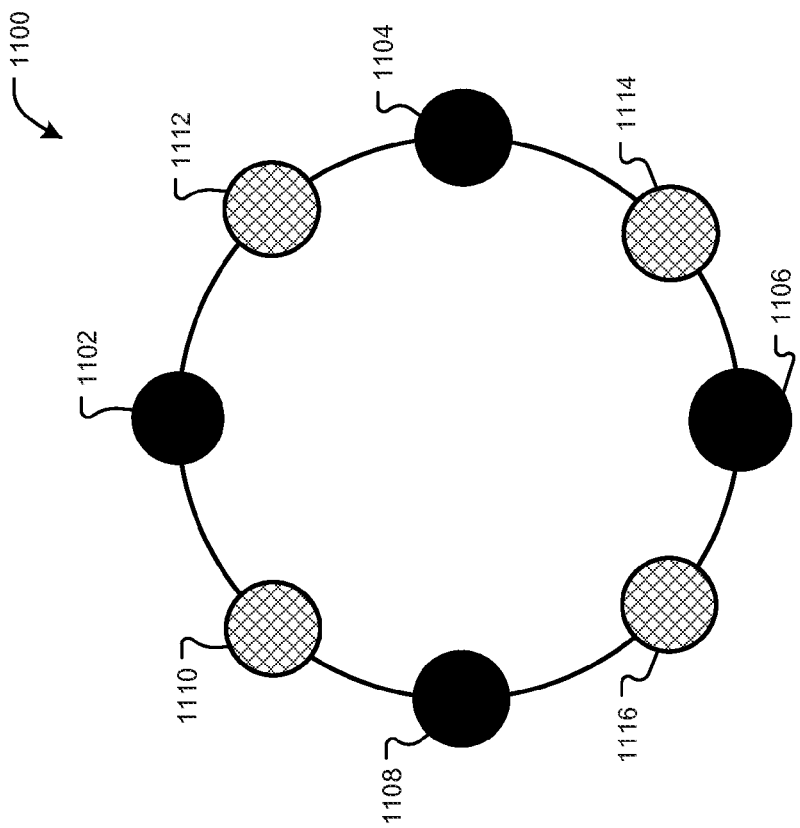
FIG. 12 is a diagram showing another example of a layout for a panoramic camera system.

FIG. 12 is a diagram showing another example of a layout for a panoramic camera system 1100. The panoramic camera system 1100 comprises a first set of image sensors 1102, 1104, 1106, 1108 and a second set of image sensors 1110, 1112, 1114, 1116. The first set of image sensors 1102, 1104, 1106, 1108 may be positioned with overlapping fields-of-view, for example, similar to the image sensors of the panoramic camera system 200 of FIG. 5. The second set of image sensors 1110, 1112, 1114, 1116 may be positioned offset between the first set of image sensors 1102, 1104, 1106, 1108. For example, the field-of-view of each image sensor in the second set of image sensors may overlap the fields-of-view of each of the adjacent image sensors from the first set of image sensors, for example, as the field-of-view 22 of the reference image sensor 4 overlaps the fields-of-view 20 and 24 of the image sensors 2 and 6 in FIG. 1. In some examples, images sensors from both sets may have similar properties including, for example, the same or similar resolutions and the same or similar fields-of-view. In other examples, image sensors 1110, 1112, 1114, 1116 from the second set may have smaller resolutions and/or smaller fields-of-view than image sensors 1102, 1104, 1106 in the first set of image sensors. For example, fields-of-view of the second set of image sensors 1110, 1112, 1114, 1116 may be include overlap regions between fields-of-view of the first set of image sensors 1102, 1104, 1106, 1108. Accordingly, the second set of image sensors 1110, 1112, 1114, 1116 may act as reference image sensors for adjacent image sensors 1102, 1104, 1106, 1108 from the first set of image sensors.

Figure 13:
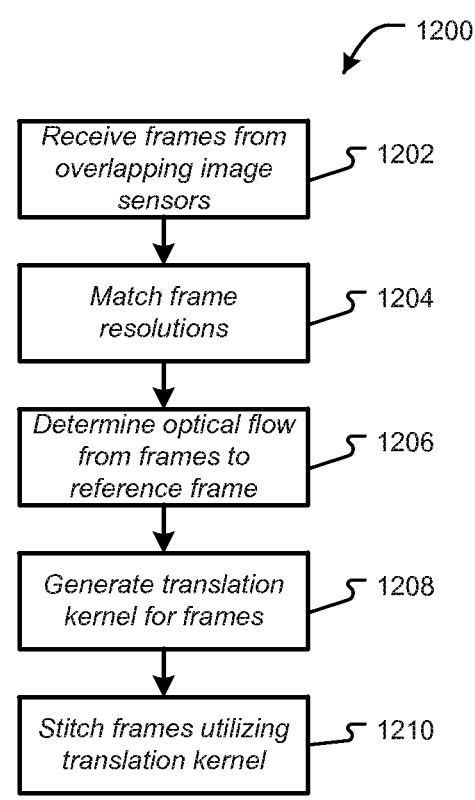
FIG. 13 is a flow chart showing one example of a process flow that may be executed by an image processor to stitch frames utilizing a reference frame.

FIG. 13 is a flow chart showing one example of a process flow 1200 that may be executed by an image processor to stitch frames utilizing a reference frame. At 1202, the image processor may receive frames from at least two image sensors with overlapping fields-of-view. Frames received at 1202 may comprise at least two primary frames and a reference frame. The two primary frames may be captured by (and, for example, received from) image sensors with overlapping fields-of-view. The reference frame may be received from an image sensor with a field-of-view overlapping the fields-of-view of both of the primary image sensors. For example, referring to FIG. 1, frames may be captured by image sensors 2, 6 while the reference frame may be captured by the reference image sensor 4. Referring to FIGS. 8 and 9, for example, the primary frames may have been captured by any of image sensors 804, 806, 808, 810 while the reference frame may have been captured by one of the image sensors 804, 806, 808, 810 positioned between the two primary image sensors (as illustrated in FIG. 9). Referring to FIG. 10, the primary frames may be captured by any of the image sensors on one of the panoramic camera systems 902a, 902b while the reference frame may have been captured by an image sensor or image sensors of the other panoramic camera system 902a, 902b. Referring to FIG. 11, the primary frames may be captured by any of the sensors 1002, 1004, 1006, 1008 while the reference frame may be captured by the reference image sensor 1010. Referring to FIG. 12, the primary frames may be captured by any of the image sensors 1102, 1104, 1106, 1108 in the first set of image sensors, while the reference frame may be captured by any of the image sensors 1110, 1112, 1114, 1116 in the second set of image sensors.

At 1204, the image processor may match the resolution of the primary frames and the reference frame. As described herein, some reference image sensors may have a lower resolution than the sensors that captured the primary frames. Accordingly, matching the resolution of primary frames and the reference frame may comprise reducing the resolution of the primary frames. This may be accomplished in any suitable manner. In some examples, the primary frames may be divided into blocks of pixel values, sometimes referred to as pixel blocks, where the number of pixel blocks is equivalent to the resolution of the reference frame. The image process may average the pixel values in each pixel block to generate reduced resolution versions of the primary frames. In lieu of averaging the pixel values, any other suitable technique may be used to reduce the resolution of the frame including, for example, bilinear or bicubic interpolation. In some examples where the resolution of the primary frames and reference frame or frames is the same, 1204 may be omitted.

In some examples, the field-of-view of the reference frame may be reduced. For example, referring to the panoramic camera system 1000 of FIG. 11, when the reference image sensor 1010 provides a reference frame with a panoramic field-of-view, the image processor may crop the reference frame to show a portion or portions overlapping the fields-of-view of the image sensors providing the primary frames.

At 1206, the image processor may determine an optical flow from the primary frames to the reference frame. The optical flow may describe a pattern of motion between the primary frames to the reference frame. The optical flow may provide an indication of how to translate the overlap-section pixels of the primary frame in the stitched version. For example, referring to FIGS. 1 and 2, the optical flow of the frame 34 to the reference frame 38 may be or comprise a vector directed from the position 18 to the position 16 (e.g., a destination position). Similarly, the optical flow of the frame 6 may be or comprise a vector directed from the position 14 to the destination position 16.

Optical flow may be found in any suitable manner. In some examples, the image processor may divide the primary frames and the reference frame into blocks of pixel values (e.g., pixel blocks). Each pixel block may have any suitable number of pixel values. For example, pixel blocks may comprise 4×4 pixels, 6×6 pixels, 8×8 pixels, 16×16 pixels, etc. In some examples, pixel blocks comprising 16×16 pixels may be referred to as macroblocks. Pixel blocks from the primary frames may then be compared to the pixel blocks of the reference frame until a match is found. Matches between pixel blocks may be found in any suitable manner. For example, the image processor may find a sum of absolute differences (SAD) or Normalized Cross Correlation (NCC). The image processor may detect a match between pixel blocks if the SAD and/or NCC value between the pixel blocks meets a threshold condition. For example, a pixel block including at least a portion of the object 12 (e.g., at the position 18) may correspond to a pixel block also including the same portion of the object 12, for example, at location 16. Any other suitable methods for finding optical flow may be found including, for example, gradient-based estimation, iterative optical flow estimation, a Lucas-Kanade method, etc.

At 1208, the image processor may generate a translation kernel or kernels considering the optical flow found at 1206. For example, the optical flow may describe, for some or all of the pixels at the primary frames, a translation to the reference frame. The translation kernel may describe translations for pixels in the overlap region of the primary frames. At 1210, the image processor may stitch the primary frames to one another utilizing the translation kernel. For example, the translation kernel may be applied as an alignment parameter, as described above with respect to FIGS. 6 and 7. The process flow 1200 may be executed in various different contexts. In some examples, the process flow 1200 may be executed as the primary frames are captured. For example, referring to FIG. 1, the parallax causes changes in the relative positions 18 and 14 when the object 12 is at different positions in the environment 10. Therefore, in some examples, the process flow 1200 may be executed for every set of primary frames captured. Also, in some examples, the process flow 1200 may be executed to calibrate a panoramic camera system. For example, referring to FIGS. 8 and 9, one or more of the image sensors 804, 806, 808, 810 may be positioned on the mounting assembly 802 during manufacturing or testing to determine a translation kernel for the panoramic camera system 800 and/or a pair of adjacent image sensors thereof. Afterwards, the calculated translation kernel may be used by the panoramic camera system 800 for stitching without constant recalculation. Also, although the process flow 1200 is described with respect to two primary frames and one reference frame, any number of primary and reference frames may be captured at the same time. For example, each set of two primary frames may have at least one reference frame showing the overlap regions of the primary frames.

Figure 14:
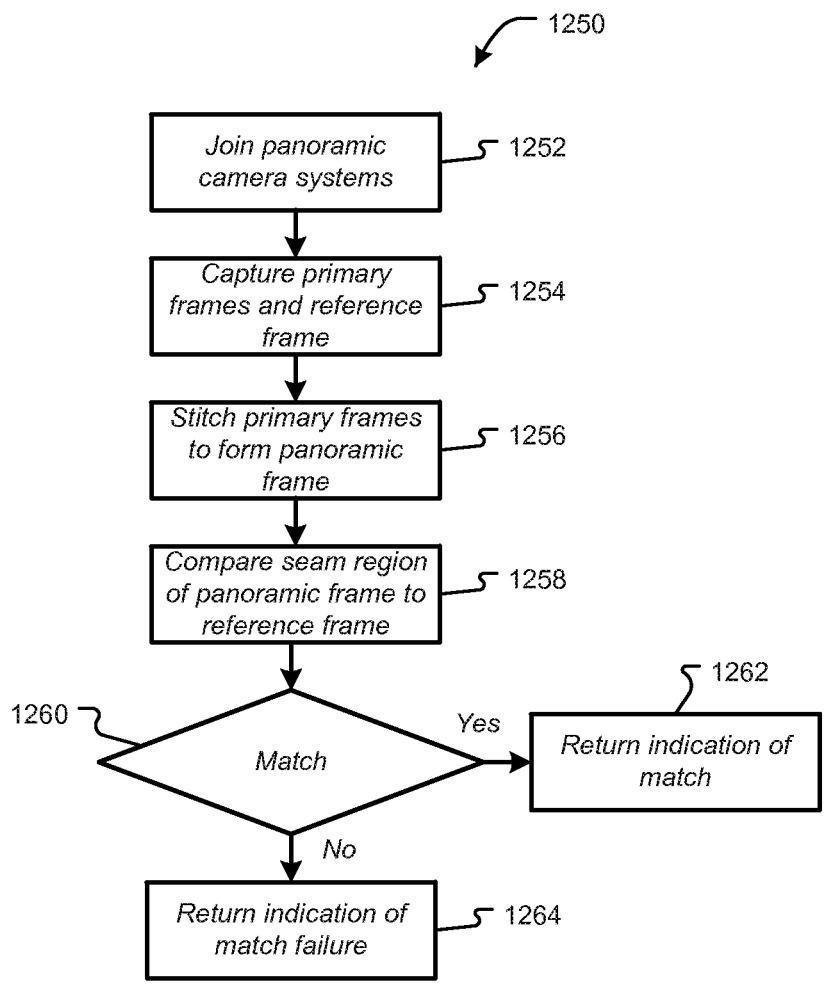
FIG. 14 is a flow chart showing one example of a process flow to verify the robustness of a stitching algorithm to parallax and/or ghosting artifacts.
Figure 15:
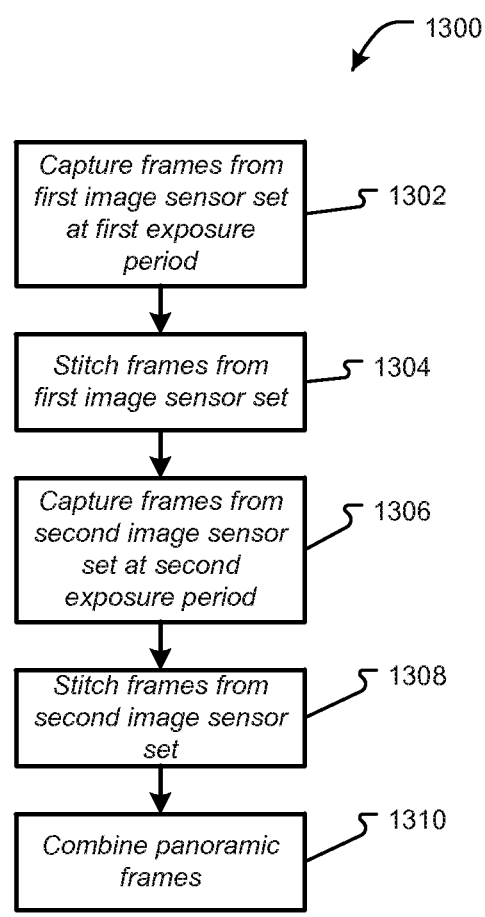
FIG. 15 is a flow chart showing one example of a process flow that may be executed by the image processor to capture a single-shot high dynamic range (HDR) frame.

FIG. 14 is a flow chart showing one example of a process flow 1250 to verify the robustness of a stitching algorithm to parallax and/or ghosting artifacts. Optionally, at 1252, two panoramic camera systems may be joined together. For example, panoramic camera systems may be positioned as systems 902a, 902b in FIG. 10, allowing the image sensor or sensors of one system to be used as reference image sensors for the other panoramic camera system. In examples including panoramic camera systems that include reference image sensors, 1252 may be omitted. At 1254, an image processor may instruct the appropriate image sensors to capture two primary frames and a reference frame, for example, at or near the same time. When two separate panoramic camera systems are used, as described at 1252 and in FIG. 10, the systems may be synchronized to allow the frames to be captured at or near the same time, for example, as described in FIG. 10. At 1256, the image processor may stitch the primary frames to form a panoramic frame. In some examples, more than two primary frames may be stitched into a single panoramic frame.

At 1258, the image processor may compare a seam region of the panoramic frame to the reference frame depicting that seam region. For example, referring to FIGS. 1 and 2, when the frames 34 and 36 are stitched, the seam region of the resulting panoramic frame may be derived from the overlap regions 40, 42. The image processor may identify a seam region by identifying the portion of the panoramic frame where two image sensor frames were stitched. For example, the seam region may correspond to the overlap regions of the constituent frames, such as overlap regions 40, 42 in FIG. 2. A reference image sensor may be the sensor that captures the reference frame, and may be any of the various reference image sensors described herein including, for example, 1110, 1112, 1114, 1116, 1010, 908a, 906a, 804, etc. In some examples, the reference image sensor may have a large field-of-view or even a 360° field-of-view, such as the image sensor 1010. Where the field-of-view of the reference image sensor is greater than an overlap between the fields-of-view of the image sensors that captured the primary frames, the image processor may identify a set of pixel values from the reference frame that corresponds to the seam region. For example, the image processor may assign each pixel column in the primary frames and the reference frame an angle representing the angular position of a scene around the camera depicted by that pixel column. The portion of the reference frame corresponding to the seam region may be a portion of the reference frame including the same angular positions as the overlap regions 40, 42 of the primary frames.

Comparing the seam region to the reference frame may be done in any suitable manner. For example, a structural similarity (SSIM) index may be found between the seam region and the reference frame. Other suitable comparisons may include, for example, a multi-scale structural similarity (MS-SSIM) index. At 1260, the image processor may determine whether the comparison at 1258 indicates a match. For example, the comparison may indicate a match of the determined index is greater than a threshold value. If a match is found, the image processor may return an indication of a match at 1262. If no match is found, the image processor may return an indication of match failure at 1264. Match failure may indicate that the panoramic frame includes parallax and/or ghosting artifacts. For example, match failure may indicate that refinement to the stitching algorithm (and translation kernel) may be desirable, for example, in the manner described by the process flow 1200. In some examples, the image processor may be programmed to execute the process flow 1200 if match failure is determined. Match failure or success may be returned in any suitable manner. For example, the image processor may be and/or be in communication with a user device comprising an output lamp or other display such as the display component 106 that may be used to indicate match success or failure. In some examples, the image processor may communicate match success or failure to another user device (e.g., a device of the environment 50).

In some examples, when the match at 1260 fails, the image processor may make corrections to the stitching process. For example, upon failure of the match at 1260, the image processor may execute the process flow 1200 to generate a new translation kernel or kernels. In some examples, the image processor may utilize the primary and reference frames captured at 1254 of the process flow 1250 when executing the process flow 1200.

FIG. 16 is a flow chart showing one example of a process flow 1300 that may be executed by the image processor to capture a single-shot high dynamic range (HDR) frame. HDR frames are typically captured by taking successive exposures of a scene utilizing the same image sensor with different exposure periods. In various examples, however, an HDR frame may be captured with a single shot utilizing a panoramic camera system that comprises image sensors with overlapping fields-of-view such that the total field-of-view of the panoramic camera system falls within the specific field-of-view of at least two image sensors. For example, the process flow 1300 may be executed by or in conjunction with a panoramic camera system that comprises image sensors with overlapping fields-of-view such that the total field-of-view of the panoramic camera system falls within the specific field-of-view of at least two image sensors. For example, referring to the panoramic camera system 1100 of FIG. 12, adjacent image sensors 1102, 1104, 1106, 1108 from the first group may have overlapping fields-of-view, for example, similar to the image sensors 202 shown in FIG. 5. Further, adjacent image sensors 1110, 1112, 1114, 1116 from the second group may also have overlapping fields-of-view also similar to the image sensors 202 of FIG. 5. As a result, each position around the panoramic camera system 1100 may fall within the field-of-view of at least two image sensors 1102, 1104, 1106, 1108, 1110, 1112, 1114, 1116.

At 1302, the image processor may capture frames from a first set of image sensors 1102, 1104, 1106, 1108 at a first exposure period. At 1304, the image processor may stitch the frames captured at 1302 to form a first panoramic frame. At 1306, the image processor may capture frames from a second set of image sensors 1110, 1112, 1114, 1116 at a second exposure period. At 1308, the image processor may stitch the frames captured at 1308 into a second panoramic frame. The second exposure period may be longer than the first exposure period. Accordingly, the second panoramic frame may be brighter than the first panoramic frame.

At 1310, the image processor may combine the first and second panoramic frames to form an HDR frame. The first and second panoramic frames may be combined in any suitable manner. In some examples, the image processor may generate the HDR frame by applying a tone mapping algorithm. For example, the first and second panoramic frames may be of the same resolution. Accordingly, the first and second panoramic frames may comprise corresponding pixel values, (e.g., pixel values that depict the same portion of the scene). In some examples, one panoramic frame or the other may be designated a default frame. The image processor may then analyze corresponding pixels from the first and second panoramic frames to determine whether the pixels are under saturated or over saturated. One frame or the other may be designated as the default frame. If a pixel value from the default frame is neither over nor under saturated, then the image processor may transfer that pixel value to the HDR frame. On the other hand, if a pixel value from the default frame is over or under saturated, then the image processor may transfer to the HDF frame the corresponding pixel from the other panoramic frame.

Also, in some examples, the image processor may combine panoramic frames utilizing segmenting. For example, the image processor may analyze the first and second panoramic frames to identify high-contrast portions therein. High-contrast portions may be identified, for example, by calculating a contrast at a plurality of positions in the frames. Positions having contrast above a threshold may be considered high-contrast portions. Portions of the frames with high contrast may be correctly exposed, with remainder portions of the frames being either over-exposed or under-exposed. In some examples, the high-contrast portions from each of the first and second panoramic frames may be copied to the HDR frame.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. An image processing system comprising:
a first image sensor having a first field-of-view;
a second image sensor having a second field-of-view that partially overlaps the first field-of-view;
a reference image sensor having a third field-of-view, wherein the third field-of-view overlaps the first field-of-view and the second field-of-view, and wherein the reference image sensor is positioned between the first image sensor and the second image sensor; and
an image processor having associated memory, wherein the image processor is programmed to:
receive, from the first image sensor, a first frame, the first frame comprising a first plurality of pixel values arranged according to a two-dimensional grid;
receive, from the second image sensor, a second frame, the second frame comprising a second plurality of pixel values arranged according to the two-dimensional grid;
receive, from the reference image sensor, a reference frame comprising a third plurality of pixel values arranged according to the two-dimensional grid;
reduce a resolution of the first frame to form a reduced resolution first frame by averaging at least a first pixel value and a second pixel value, wherein the first pixel value and the second pixel value are selected from the first plurality of pixel values, and wherein the first pixel value and the second pixel value are adjacent one another on the two-dimensional grid;
reduce a resolution of the second frame to form a reduced resolution second frame by averaging at least a third pixel value and a fourth pixel value, wherein the third pixel value and the fourth pixel value are selected from the second plurality of pixel values, and wherein the third pixel value and the fourth pixel value are adjacent one another on the two-dimensional grid;

identify a first optical flow from the reduced resolution first frame to the reference frame, wherein the image processor is programmed to identify the first optical flow by:
matching a pixel block of the reduced resolution first frame comprising a set of pixel values from the reduced resolution first frame to a pixel block of the reference frame comprising a set of pixel values from the reference frame; and
determining a first translation between a position of the pixel block of the reduced resolution first frame on the two-dimensional grid and a position of the pixel block of the reference frame on the two-dimensional grid;
identify a second optical flow from the reduced resolution second frame to the reference frame to generate a second translation between a position of a pixel block of the reduced resolution second frame on the two-dimensional grid and the position of the pixel block of the reference frame on the two dimensional grid;
generate a translation kernel based on the first optical flow and the second optical flow, wherein the translation kernel comprises the first translation and the second translation;
apply the translation kernel to the first frame to generate a translated first frame by shifting a plurality of first frame pixel values, and wherein shifting the plurality of first frame pixel values comprises shifting a first pixel value from the position of the pixel block of the reduced resolution first frame to the position of the pixel block of the reference frame;
apply the translation kernel to the second frame to generate a translated second frame by shifting a plurality of second frame pixel values, wherein shifting the plurality of second frame pixel values comprises shifting a second pixel value from the position of the pixel block of the second frame to the position of the pixel block of the reference frame; and
stitch the translated first frame and the translated second frame to form a panoramic frame.

2. The image processing system of claim 1, wherein the third field-of-view is 360°, and wherein the image processor is further programmed to, before identifying the first optical flow, crop the reference frame to generate a cropped reference frame showing a portion of the reference frame that overlaps the first field-of-view and the second field-of-view.

3. The image processing system of claim 1, further comprising a mounting assembly, wherein the first image sensor and the second image sensor are positioned on the mounting assembly and have a first angular offset of about 90°, and wherein the reference image sensor is positioned on the mounting assembly and has a second angular offset of about 45° relative to the first image sensor and a third angular offset of about 45° relative to the second image sensor.

4. An image processing system, comprising:
a mounting assembly;
a first image sensor coupled to the mounting assembly and having a first field-of-view;
a second image sensor coupled to the mounting assembly and having a second field-of-view that partially overlaps the first field-of-view;
a third image sensor coupled to the mounting assembly and having a third field-of-view that overlaps the first field-of-view and the second field-of-view;
a processor and associated memory, wherein the processor is programmed to:
receive, from the first image sensor, a first frame comprising a first plurality of pixel values arranged according to a two-dimensional grid;
receive, from the third image sensor, a third frame comprising a third plurality of pixel values arranged according to the two-dimensional grid;
identify a first optical flow from the first frame to the third frame;
generate a translation kernel based at least in part on the first optical flow, wherein the translation kernel comprises data describing a first translation from a first position of the first frame to a destination position on the third frame; and
apply the translation kernel to generate a translated first frame.

5. The image processing system of claim 4, wherein the third image sensor is positioned between the first image sensor and the second image sensor.

6. The image processing system of claim 4, wherein the processor is further programmed to:
receive, from the second image sensor, a second frame comprising a second plurality of pixel values arranged according to the two-dimensional grid;
identify a second optical flow from the second frame to the third frame, wherein generating the translation kernel is also based at least in part on the second optical flow, and wherein the translation kernel comprises a second translation from a second position of the second frame to the destination position;
apply the translation kernel to generate a translated second frame; and
stitch the translated first frame and the translated second frame.

7. The image processing system of claim 4, wherein the first field-of-view and the second field-of-view subtend the same angle, and wherein the third field-of-view is narrower than the first field-of-view and the second field-of-view.

8. The image processing system of claim 4, wherein the third field-of-view is 360°, and wherein the processor is further programmed to, before identifying the first optical flow, crop the third frame to generate a cropped third frame showing a portion of the third frame that overlaps the first field-of-view and the second field-of-view.

9. The image processing system of claim 4, wherein the first image sensor and the second image sensor are positioned on the mounting assembly with an angular offset of about 90°.

10. The image processing system of claim 9, wherein the third image sensor is positioned on the mounting assembly with a first angular offset from the first image sensor of about 45° and with a second angular offset from the second image sensor of about 45°.

11. The image processing system of claim 9, wherein the mounting assembly comprises an image sensor mounting position with a second angular offset from the first image sensor of about 90°, wherein the second angular offset between the image sensor mounting position and the first image sensor is in a direction opposite a direction from the first image sensor to the second image sensor, and wherein the third image sensor is positionable at the image sensor mounting position.

12. The image processing system of claim 4, wherein a resolution of the first frame is higher than a resolution of the third frame, and wherein the processor is further programmed to reduce the resolution of the first frame to match the resolution of the third frame.

13. The image processing system of claim 4, wherein identifying the first optical flow from the first frame to the third frame comprises:
   dividing the first frame into a first plurality of pixel blocks comprising a first pixel block;
   dividing the third frame into a second plurality of pixel blocks comprising a second pixel block; and
   determining that the first pixel block matches the second pixel block.

14. The image processing system of claim 4, wherein the translation kernel comprises data describing a plurality of translations comprising the first translation, and wherein the plurality of translations also comprises a second translation from a second position of the first frame to a second destination position on the third frame.

15. A method for testing a panoramic camera system comprising a first image sensor having a first field-of-view; a second image sensor having a second field-of-view overlapping the first field-of-view; and a third image sensor having a third field-of-view overlapping the first field-of-view and the second field-of-view, the method comprising:
   receiving, by an image processor, a first frame from the first image sensor;
   receiving, by the image processor, a second frame from the second image sensor;
   receiving, by the image processor, a third frame from the third image sensor;
   stitching, by the image processor, the first frame and the second frame to form a panoramic frame;
   compare a set of pixel values selected from the third frame to a seam region of the panoramic frame, wherein the seam region of the panoramic frame comprises a portion of the panoramic frame corresponding to both the first field-of-view and the second field-of-view; and
   determine that the set of pixel values does not match the seam region.

16. The method of claim 15, wherein the first image sensor and the second image sensor are of a first panoramic camera system and the third image sensor is of a second panoramic camera system, further comprising positioning the second panoramic camera system relative to the first panoramic camera system such that the third image sensor is positioned between the first image sensor and the second image sensor.

17. The method of claim 16, wherein the first panoramic camera system and the second panoramic camera system comprise interlocking features positioned to align the first panoramic camera system and the second panoramic camera system.

18. The method of claim 15, wherein the first image sensor and the second image sensor are positioned on a mounting assembly plate and have an angular offset of about 90°, further comprising:
   before receiving the third frame, moving the third image sensor from a first mounting position with an angular offset from either the first image sensor or the second image sensor of about 90° to a second mounting position with an angular offset from the first image sensor of about 45° and an angular offset from the second image sensor of about 45°.

19. The method of claim 15, wherein the third field-of-view is greater than an overlap between the first field-of-view and the second field-of-view, wherein the set of pixel values comprises less than all pixel values of the third frame, and wherein the set of pixel values depict the same portion of scene around the panoramic camera system as the seam region.

20. The method of claim 15, further comprising:
   identifying, by the image processor, a first optical flow from the first frame to the third frame;
   generating, by the image processor, a translation kernel based at least in part on the first optical flow, wherein the translation kernel comprises data describing a first translation from a first position of the first frame to a destination position on the third frame; and
   applying, by the image processor, the translation kernel to generate a translated first frame;
   generating a translated second frame; and
   stitching the translated first frame and the translated second frame to form a corrected panoramic frame.

* * * * *